(12) United States Patent
Varoquie et al.

(10) Patent No.: US 10,330,569 B2
(45) Date of Patent: Jun. 25, 2019

(54) METHOD FOR DETERMINING THE ENGINE TORQUE DELIVERED BY A MULTI-CYLINDER ENGINE

(71) Applicants: CONTINENTAL AUTOMOTIVE FRANCE, Toulouse (FR); CONTINENTAL AUTOMOTIVE GMBH, Hannover (DE)

(72) Inventors: Bertrand Varoquie, Eaunes (FR); Camille Denert, Ramonville (FR)

(73) Assignees: CONTINENTAL AUTOMOTIVE FRANCE, Toulouse (FR); CONTINENTAL AUTOMOTIVE GMBH, Hannover (FR)

( * ) Notice: Subject to any disclaimer, the term of this patent is extended or adjusted under 35 U.S.C. 154(b) by 174 days.

(21) Appl. No.: 15/537,655

(22) PCT Filed: Dec. 16, 2015

(86) PCT No.: PCT/EP2015/002533
§ 371 (c)(1),
(2) Date: Jun. 19, 2017

(87) PCT Pub. No.: WO2016/102054
PCT Pub. Date: Jun. 30, 2016

(65) Prior Publication Data
US 2017/0363510 A1    Dec. 21, 2017

(30) Foreign Application Priority Data

Dec. 23, 2014 (FR) .................. 14 63199

(51) Int. Cl.
*G01M 15/08* (2006.01)
*G01M 15/05* (2006.01)
*F02D 35/02* (2006.01)

(52) U.S. Cl.
CPC ........... *G01M 15/05* (2013.01); *F02D 35/023* (2013.01); *F02D 35/024* (2013.01); *G01M 15/08* (2013.01); *F02D 2200/1004* (2013.01)

(58) Field of Classification Search
USPC ..................................... 73/114.15
See application file for complete search history.

(56) References Cited

U.S. PATENT DOCUMENTS 5,278,760 A    1/1994  Ribbens et al.
5,771,482 A    6/1998  Rizzoni et al.
(Continued)

FOREIGN PATENT DOCUMENTS

CN    103 147 868 A    6/2013
CN    104179573         12/2014
(Continued)

OTHER PUBLICATIONS

Xin Shi et al: "Processing of Hydraulic Pressure Sensor Signal Based on Wavelet Analysis" 2012 International Conference on Applied Physics and Industrial Engineering Physics Procedia 24 (2012) 2143-21SO (Chang' an University Xi' an, China, 710064 [CN]).

(Continued)

*Primary Examiner* — Eric S. McCall
(74) *Attorney, Agent, or Firm* — Young & Thompson

(57) ABSTRACT

Disclosed is a method for determining the engine torque delivered by a multi-cylinder engine, including the following steps: determining the angular velocity of the crankshaft and measuring the cylinder pressure over an angular window of combustion in a first cylinder fitted with a cylinder pressure sensor; calculating the value of the engine torque ($TQI_{ref}$) in this window; determining a current transfer function for the learning of the torque, so as to estimate the torque $TQI_{mdl}(cyl))$ in a second cylinder not fitted with a (Continued)

Figure 1:
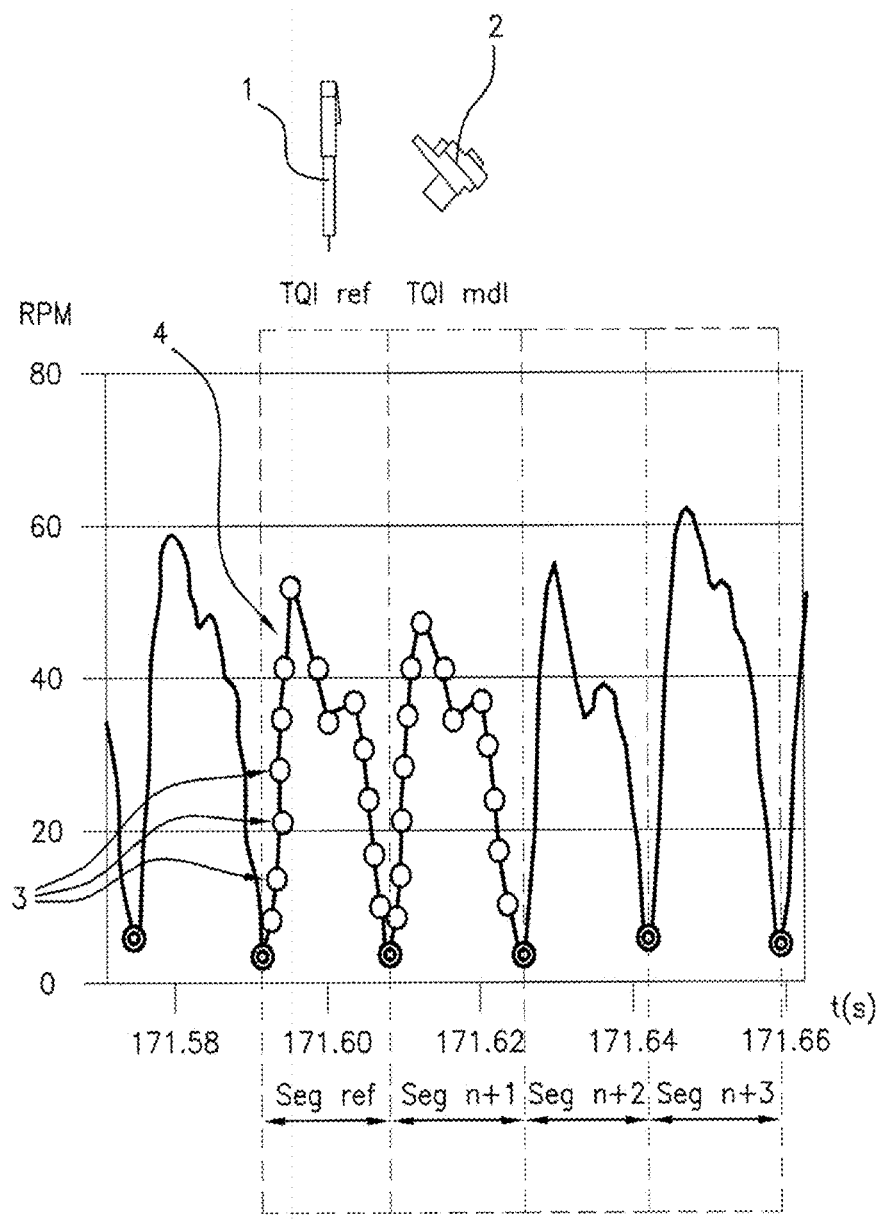

cylinder pressure sensor, from the product of: the engine torque calculated over the angular window of the first cylinder, a ratio between: the angular velocity of the crankshaft over an angular window of combustion of the second cylinder, and the angular velocity of the crankshaft over the window of combustion of the first cylinder.

18 Claims, 10 Drawing Sheets

(56) References Cited

U.S. PATENT DOCUMENTS

| | | |
|---|---|---|
| 2004/0084024 A1 | 5/2004 | Malaczynski et al. |
| 2010/0132443 A1 | 6/2010 | Kim et al. |
| 2013/0151122 A1 | 6/2013 | Jin et al. |

FOREIGN PATENT DOCUMENTS

| | | |
|---|---|---|
| DE | 102 004 057 260 A1 | 6/2006 |
| EP | 0 985 919 A1 | 3/2000 |
| EP | 1 221 603 A1 | 7/2002 |
| FR | 2 872 282 A1 | 12/2005 |
| FR | 2 950 970 A3 | 4/2011 |
| JP | 2011/001867 A | 1/2011 |
| WO | 02/071308 A1 | 9/2002 |
| WO | 2009/137297 A1 | 11/2009 |

OTHER PUBLICATIONS

Mobley, C., "Wavelet Analysis of Non-Intrusive Pressure Transducer Traces," SAE Technical Paper 2000-01-0931, 2000, tloi:10.4271/2000-01-0931.[GB] (abstract).

Search results for pressure sensor wavelet "topics.sac.org_diesel-compressionignition-engines_paper" (SAE International—Apr. 2, 2014).

International Search Report, dated May 25, 2016, from corresponding PCT/EP2015/002533 application.

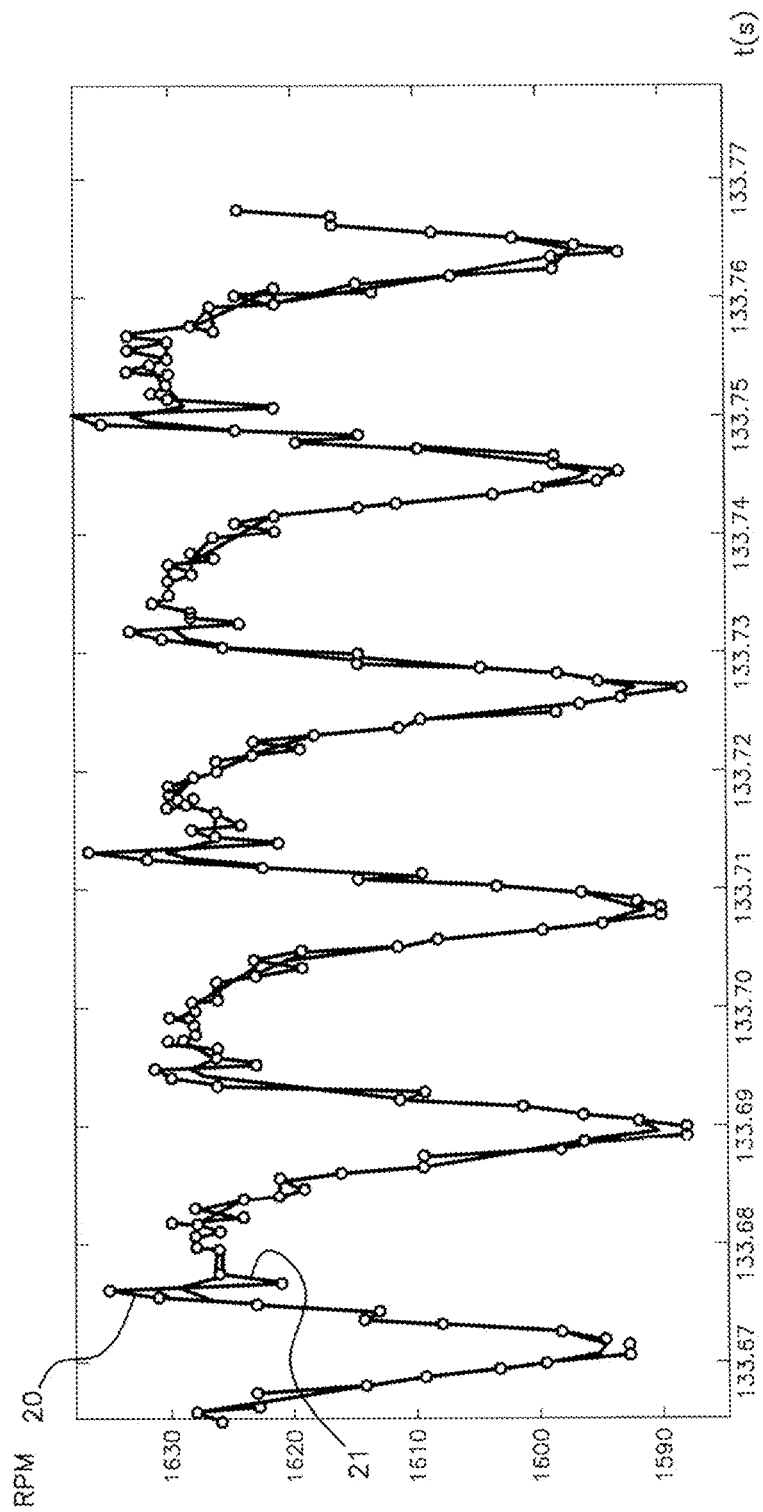

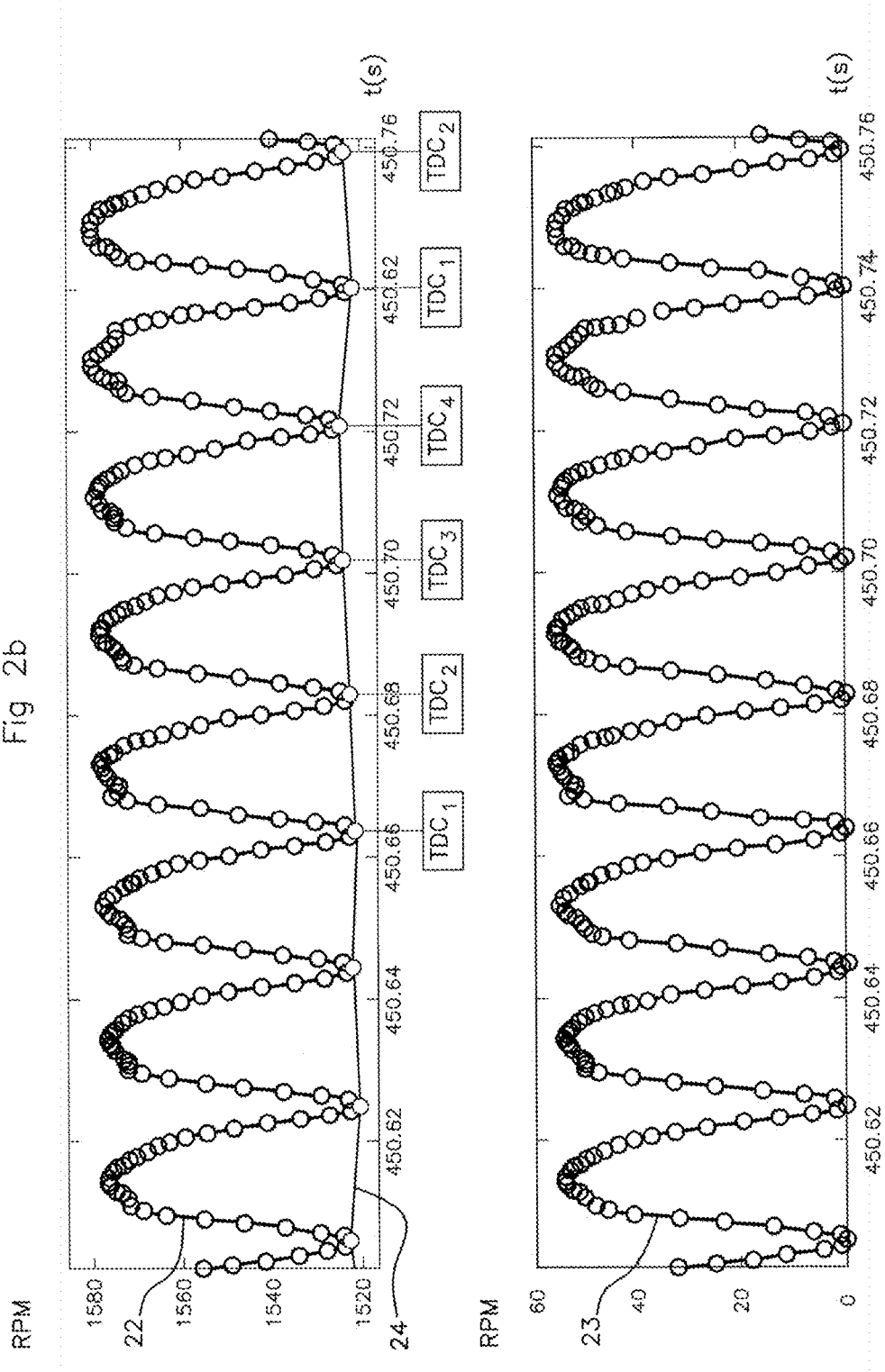

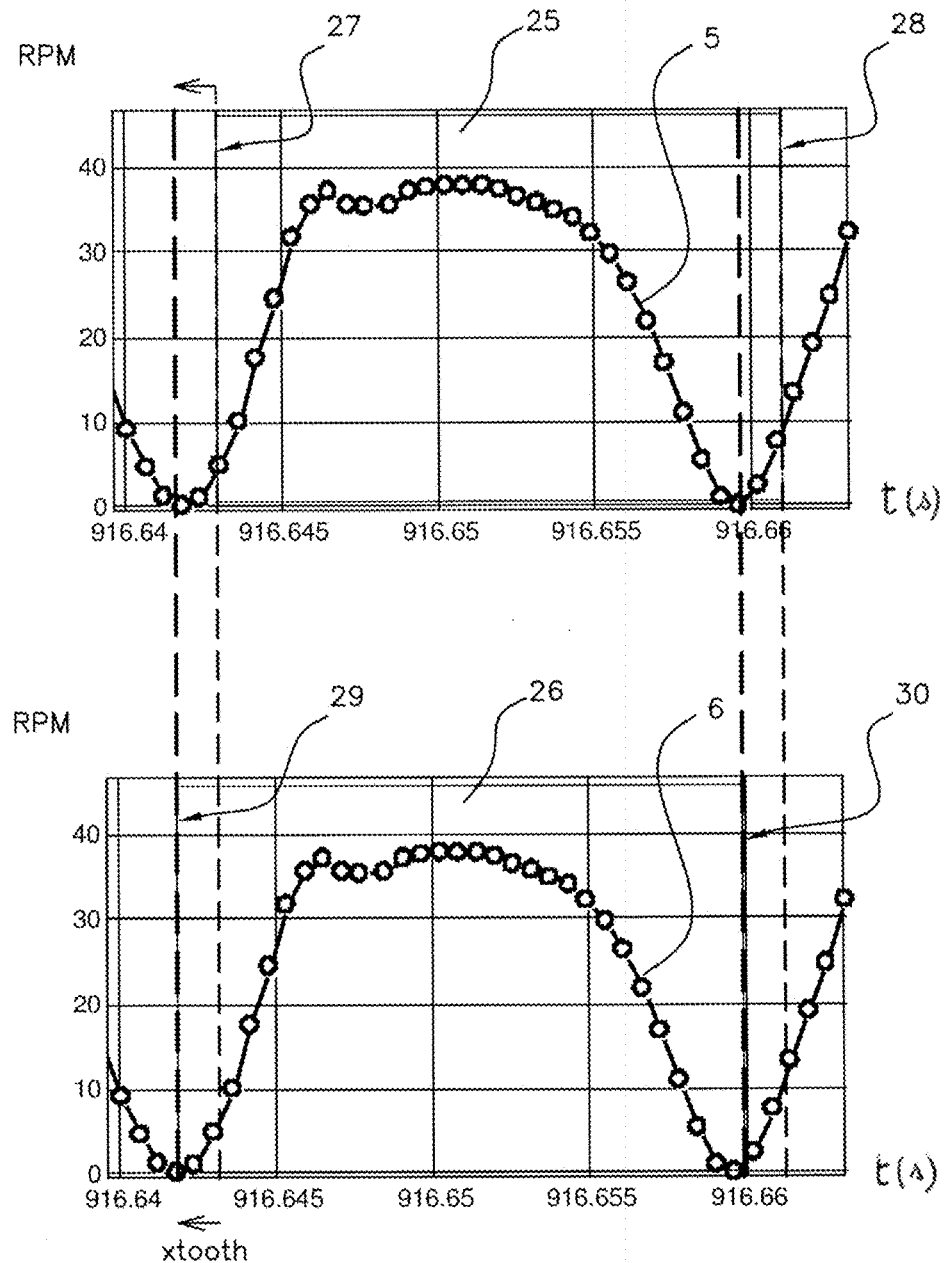

METHOD FOR DETERMINING THE ENGINE TORQUE DELIVERED BY A MULTI-CYLINDER ENGINE

The present invention relates to a method for determining the engine torque delivered by a multi-cylinder engine comprising at least one cylinder fitted with a cylinder pressure sensor and at least one cylinder not fitted with a cylinder pressure sensor, said engine comprising a crankshaft driven by pistons moving in the cylinders, and means of determining the velocity of the crankshaft. The determination of the engine torque occurs in the closed control loop for the combustion in the cylinders, which is implemented by the engine control unit of a vehicle.

The control of the engine torque demanded by the driver is done by means of the position of the accelerator pedal of the vehicle in general. The engine control unit of the vehicle detects the engine torque demanded by the driver via a sensor of position of the accelerator pedal and utilizes the information coming from a cylinder pressure sensor and a sensor of position of the crankshaft in order to act on the closed control loop for the combustion in the cylinders, so that the engine delivers the torque demanded on each of the cylinders. The engine torque furnished by the combustion of a cylinder during its combustion cycle is known as the indicated torque.

This closed control loop for the combustion in the cylinders often makes use of methods based on the fast Fourier transform of the crankshaft speed, obtained from the signal coming from the sensor of position of the crankshaft, in order to reconstruct the torque on the cylinders not fitted with a cylinder pressure sensor, based on the torque measured on the cylinder or cylinders fitted respectively with a cylinder pressure sensor, and this in real time.

The method of reconstruction of the torque based on the Fourier transform considers only the strongest mode or frequency of the speed spectrum of the crankshaft, obtained on the analyzed segment of the engine cycle of a cylinder comprising a cylinder pressure sensor. Depending on the speed and the effective applied engine torque, the signal to noise ratio of the crankshaft speed may decrease substantially, rendering the detection of the strongest mode unstable, in which case the method results in a poor estimate of the engine torque.

The present invention proposes to mitigate these drawbacks. More precisely, it consists in a method for determining the engine torque delivered by a multi-cylinder engine, comprising at least one cylinder fitted with a cylinder pressure sensor and at least one cylinder not fitted with a cylinder pressure sensor, said engine comprising a crankshaft driven by pistons moving in the cylinders, and means of determining the velocity of the crankshaft, characterized in that said method comprises the following steps:

Step 1: determining the angular velocity of the crankshaft over an angular window comprising the combustion in a current engine cycle of a first cylinder fitted with a cylinder pressure sensor, Step 2: measuring the cylinder pressure over said angular window in said current engine cycle of the first cylinder, Step 3: calculating the value of the indicated engine torque in said angular window in said current engine cycle of the first cylinder, based on said measured cylinder pressure, Step 4: determining a current transfer function for the learning of the engine torque, so as to estimate the indicated engine torque in at least a second cylinder not fitted with a cylinder pressure sensor, following said first cylinder in the direction of rotation of the crankshaft, from the product of:

the indicated engine torque calculated over said angular window in said current engine cycle of the first cylinder, a ratio between:

the angular velocity of the crankshaft over an angular window comprising the combustion in a current engine cycle of the second cylinder, following said current engine cycle of the first cylinder, and the angular velocity of the crankshaft over said angular window comprising the combustion in said current engine cycle of the first cylinder;

Step 5: applying said current transfer function for learning of the engine torque to each engine cycle of a cylinder not fitted with a cylinder pressure sensor, following said first cylinder, until the next engine cycle of a cylinder fitted with a cylinder pressure sensor;

Step 6: updating said current transfer function for learning of the engine torque, reiterating the preceding steps until determining a new current transfer function for learning of the engine torque, during said next engine cycle of a cylinder fitted with a cylinder pressure sensor.

The method according to the invention makes it possible to learn, for the model of estimated torque for a cylinder not fitted with a cylinder pressure sensor, the relation between the oscillations of engine speed corresponding to the torque demanded by the engine control unit in an engine cycle of a cylinder fitted with a cylinder pressure sensor. The method according to the invention is aimed in particular at properly correlating the estimated engine torque in a cylinder not fitted with a cylinder pressure sensor at the operating points having several modes or frequencies of vibrations in a cylinder fitted with a cylinder pressure sensor, which would make unstable the calculation of the indicated engine torque based on the Fourier transform. The result thereof is increased robustness of the control loop for the combustion which is implemented by the engine control unit. The invention also proposes a self-adapting method for the closed control loop for the combustion.

According to one advantageous characteristic, said current transfer function for learning of the engine torque is given by the following expression:

$$TQI_{mdl}(cyl) = TQI_{ref} \frac{\sum_{i=1}^{i=nb_{tooth}} n_{cyl}(i)}{\sum_{i=1}^{i=nb_{tooth}} n_{ref}(i)}$$

where:

$TQI_{mdl}(cyl)$ is the estimated engine torque for said second cylinder not fitted with a cylinder pressure sensor, in an angular window $Seg_{n+1}$ comprising the combustion of the current engine cycle and corresponding to the incident oscillation of the engine speed in this window $Seg_{n+1}$, $TQI_{ref}$ is the current reference engine torque measured on said first cylinder fitted with a cylinder pressure sensor, in an angular window $Seg_{ref}$ comprising the combustion of the current engine cycle and corresponding to the incident oscillation of the engine speed in this window $Seg_{ref}$, $nb_{tooth}$ is the number of teeth of the position sensor of the crankshaft, $n_{cyl}(i)$ is the engine speed obtained with reference to a sampled signal showing the angular position of the crankshaft, taken at the measurement point of index i in the angular window $Seg_{n+1}$ of the second cylinder, $n_{ref}(i)$ is the engine speed obtained with reference to the sampled signal showing the angular position of the crankshaft, taken at the measurement point of index i in the angular window $Seg_{ref}$ of the first cylinder.

The choice of such a transfer function makes it possible to allow for a plurality of modes to be taken into account and thus provides a more faithful image of the measured torque based on a cylinder pressure sensor and which is transferred to the cylinders not fitted with a cylinder pressure sensor. The value of the engine speed corresponding to the angular segment of the combustion of a cylinder fitted with a cylinder pressure sensor is stored in the memory, for example of the engine control unit, for each measurement point of the angle sampling of the measurement of the cylinder pressure. The values of the indicated torque $TQI_{ref}$ and of the engine speed $n_{ref}(i)$ are updated every $720°/N_{Pcylsensor}$ of rotation of the crankshaft, with $N_{Pcylsensor}$ being the number of sensors of cylinder pressure outfitting the engine, given that a cylinder has not more than one sensor, or for a single sensor of cylinder pressure for a four cylinder engine, every 720°.

According to one advantageous characteristic, one introduces a correction function $f(N,Cyl_{nr},TQI_{ref})$ for the estimation of the engine torque, connected with the deformation of the crankshaft as a function of the position of the cylinder in question for the estimation of the torque on the crankshaft, in order to define said current transfer function for the learning of the engine torque, according to the following expression:

$$TQI_{mdl}(cyl) = TQI_{ref} f(N, Cyl_{nr}, TQI_{ref}) \frac{\sum_{i=1}^{i=nb_{tooth}} n_{cyl}(i)}{\sum_{i=1}^{i=nb_{tooth}} n_{ref}(i)}$$

where:

$f(N,Cyl_{nr},TQI_{ref})$ represents said correction function, which is a function of the current engine speed N, and/or of the number $Cyl_{nr}$ of cylinders in question for the engine, representing its position in relation to the crankshaft, and/or the current reference engine torque or indicated torque $TQI_{ref}$, The other terms having been defined above.

The following correction $Cyl_{nr}$ makes it possible to allow for the deformation in rotation of the crankshaft consequent upon the torsional torque to be taken into account, which is larger as the cylinder gets further away from the engine flywheel.

According to one advantageous characteristic, the engine speed $n_{ref}(i)$ obtained with reference to the sampled signal showing the angular position of the crankshaft, taken at the measurement point of index in the angular window $Seg_{ref}$ of the first cylinder, or in an angular window $Seg_{n+1}$ of the second cylinder, is filtered by a moving average filter of order k, defined as follows:

$$n_X^{filt}(i) = \frac{\sum_{k=1}^{k=order\,of\,the\,filter} a_k n_x(i-k) + a_o n_x(i) + \sum_{k=1}^{k=order\,of\,the\,filter} a_k n_x(i+k)}{a_o + 2 \sum_{k=1}^{k=order\,of\,the\,filter} a_k}$$

where:

$n_X^{filt}(i)$ is the engine speed $n_{ref}(i)$ or $n_{cyl}(i)$, filtered at each tooth i, $n_X(i)$ is the engine speed $n_{ref}(i)$ or $n_{cyl}(i)$ at each tooth i, $a_k$ is the weight of the contribution to the filtering, defined a priori as being a function of the signal to noise ratio of the raw signal $n_X(i)$, k is the order of the filter, i is the tooth in question of the position sensor, and corresponds to the measurement point of index i.

The above characteristic consists in applying advantageously a moving average filter to the signal coming from the sensor for the angular position of the crankshaft, based on which the engine speed is calculated, before applying to it the current transfer function for learning of the engine torque in order to estimate the latter at the cylinders not comprising a cylinder pressure sensor. This filter makes it possible to suppress the transient fluctuations in the data of the sampled signal of the sensor by emphasizing the longer-term trends of this signal. The moving average filter constitutes a first step for the processing of the sampled signal of the sensor for angular position of the crankshaft.

According to one advantageous characteristic, the engine speed $n_X^{filt}(i)$ obtained by the preceding characteristic is filtered in order to subtract from it the trend engine speed, according to the following expression:

$$n_X^{osc}(i) = n_X^{filt}(i) - n_X^{trend}(i)$$

where:

$n_X^{osc}(i)$ is the form of the oscillation of the engine speed $n_X^{filt}(i)$ for the tooth i in a combustion cycle for a given cylinder, $n_X^{trend}(i)$ is the engine speed obtained for the tooth i, corresponding to the lower dead center, representing the trend engine speed, $n_X^{filt}(i)$ having been defined above.

This characteristic makes it possible to select only the form of oscillation of speed for a given engine cycle and cylinder. This filter constitutes a second processing step of the sampled signal coming from the sensor of angular position of the crankshaft, before application of the learning transfer function of the engine torque.

According to one advantageous characteristic, said angular window for measurement of the cylinder pressure for which the engine speed $n_X^{osc}(i)$ is obtained according to the preceding characteristic, is offset as a function of the engine speed, such that the minimum speed oscillation $n_X^{osc}(i)$ in the segment in question belongs to this window, according to the following expression:

$$n_X^{wind}(i) = n_X^{osc}(i - x_{tooth})$$

where:

$n_X^{wind}(i)$ represents the speed oscillation offset by $x_{tooth}$ teeth and windowed such that the tooth is comprised between 1 and $nb_{tooth}$, $x_{tooth}$ is the number of teeth offset before or after the upper dead center position of compression TDC, the minimum engine speed in the angular window in question not always being positioned at the upper dead center position of compression TDC: $x_{tooth}=\varepsilon(N,TQI_{ref})$ depends on the current engine speed N and on the indicated torque $TQI_{ref}$, $n_X^{osc}(i)$ having been defined above.

This characteristic proposes a dynamic or movable window for measurement of the cylinder pressure as a function of the indicated engine torque and of the engine speed. This filter constitutes a third processing step of the sampled signal coming from the sensor of angular position of the crankshaft, before application of the learning transfer function for the engine torque.

According to one advantageous characteristic, said angular window movable according to the offset speed oscillation $n_X^{wind}(i)$ furthermore has a dynamic width, defined by the following expression:

$$n_X^{weight}(i)=\gamma(i,N,GEAR,TQI_{ref})n_X^{wind}(i)$$

where:

$n_X^{weight}(i)$ is the speed oscillation in question for the engine segment obtained by truncating the window applied by the function $\gamma(i,N,GEAR,TQI_{ref})$, for the cylinder fitted with a cylinder pressure sensor, $\gamma(i,N,GEAR,TQI_{ref})$ is the form of the truncation window as a function of the current engine speed the engaged gearbox ratio GEAR, and the current reference engine torque or indicated torque $TQI_{ref}$ measured for said first cylinder fitted with a cylinder pressure sensor, $n_X^{wind}(i)$ having been defined above.

With this characteristic, depending on the form of oscillation $n_X^{wind}(i)$ of the engine speed, the form of the truncation window $n_X^{weight}(i)$ of the engine speed can be redefined to obtain a more robust signal processing and, consequently, an increased final precision for the estimated engine torque. This filter constitutes a fourth processing step for the sampled signal coming from the sensor of angular position of the crankshaft, before application of the learning transfer function for the engine torque.

According to one advantageous characteristic, said angular window corresponding to the combustion in a current engine cycle of said first cylinder is defined by an angular interval equal to 360°, distributed from 180° before the upper dead center of compression to +180° after the upper dead center of compression.

According to one advantageous characteristic, the indicated engine torque which is estimated for said second cylinder not fitted with a cylinder pressure sensor takes into account all four filtering steps for the sampled signal coming from the sensor of angular position of the crankshaft, as defined above, and is obtained by the following expression:

$$TQI_{mdl}(cyl) = TQI_{ref} \times f(N, Cyl_{nr}, TQI_{ref}) \times \frac{\sum_{i=1}^{i=nb_{tooth}} n_{cyl}^{weight}(i)}{\sum_{i=1}^{i=nb_{tooth}} n_{ref}^{weight}(i)}$$

in which the elements of the expression have been defined above.

Other characteristics and advantages will appear upon perusal of the following exemplary embodiments of a method according to the invention, accompanied by enclosed drawings given as a nonlimiting illustration.

Figure 4A:
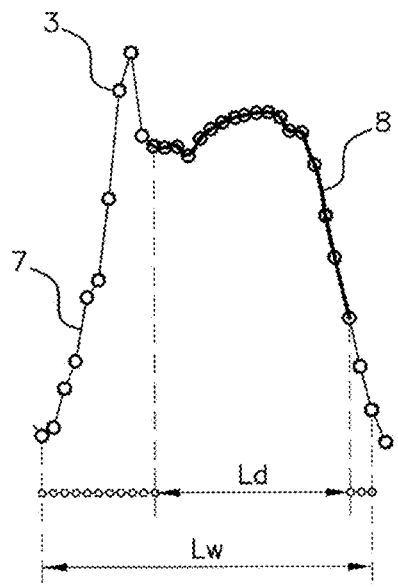
Figure 4B:
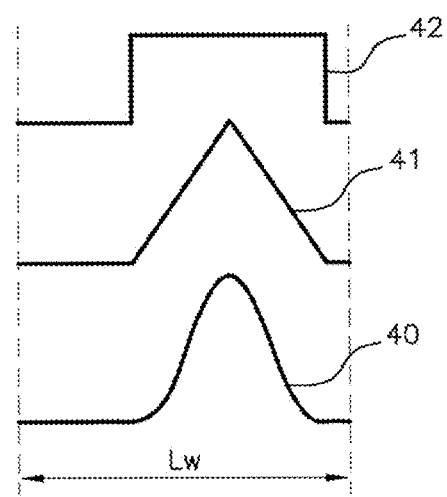
Figure 5:
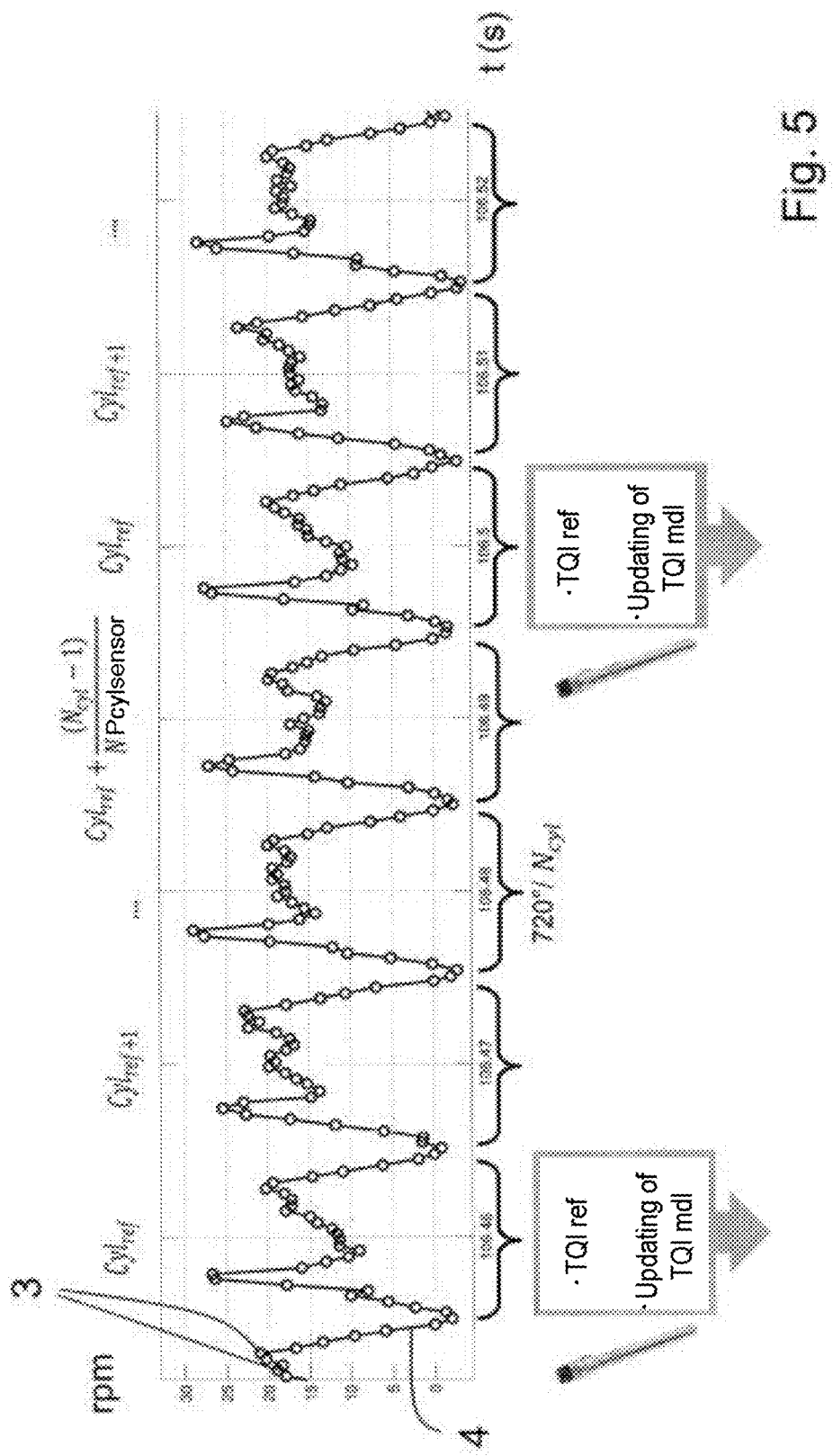
Figure 6:
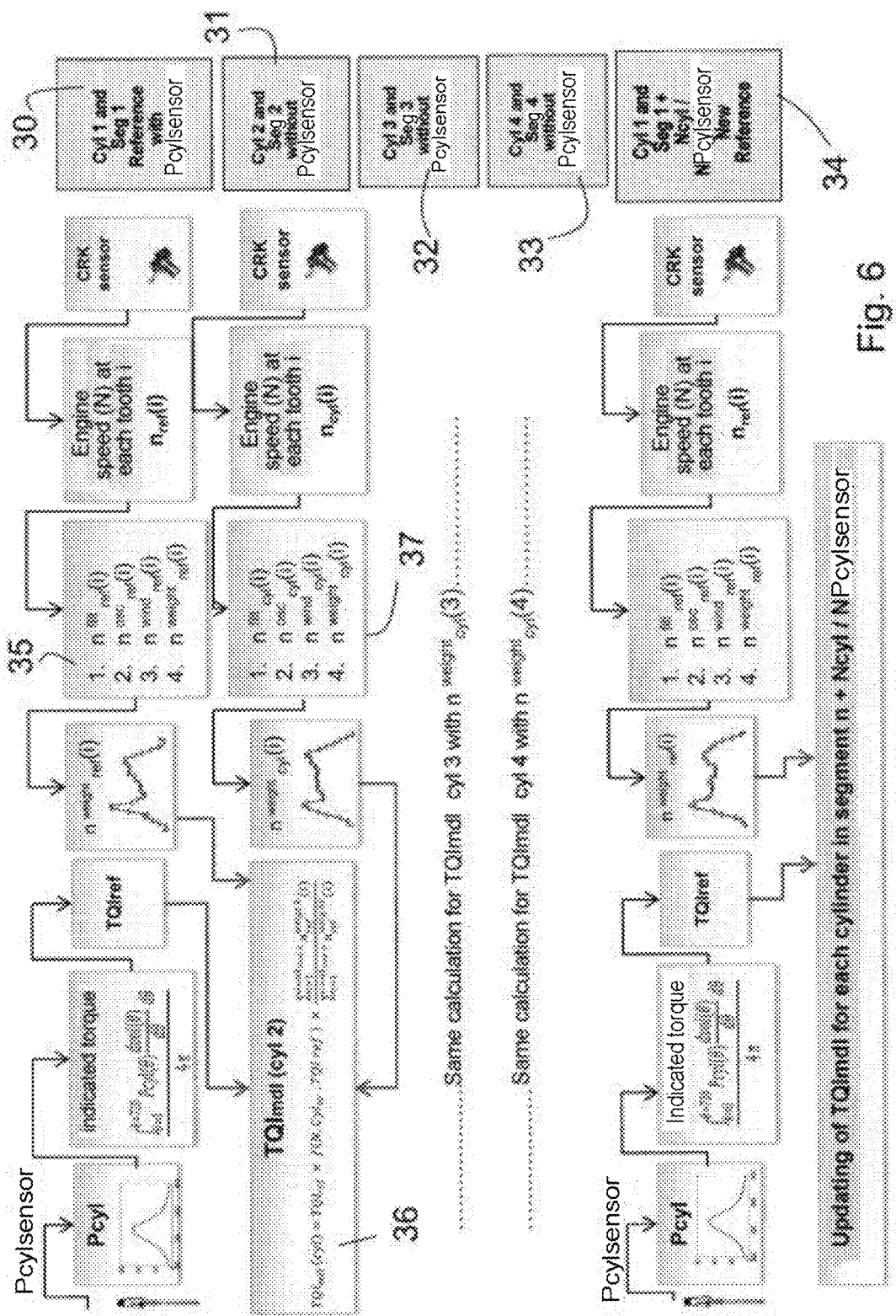
Figure 7A:
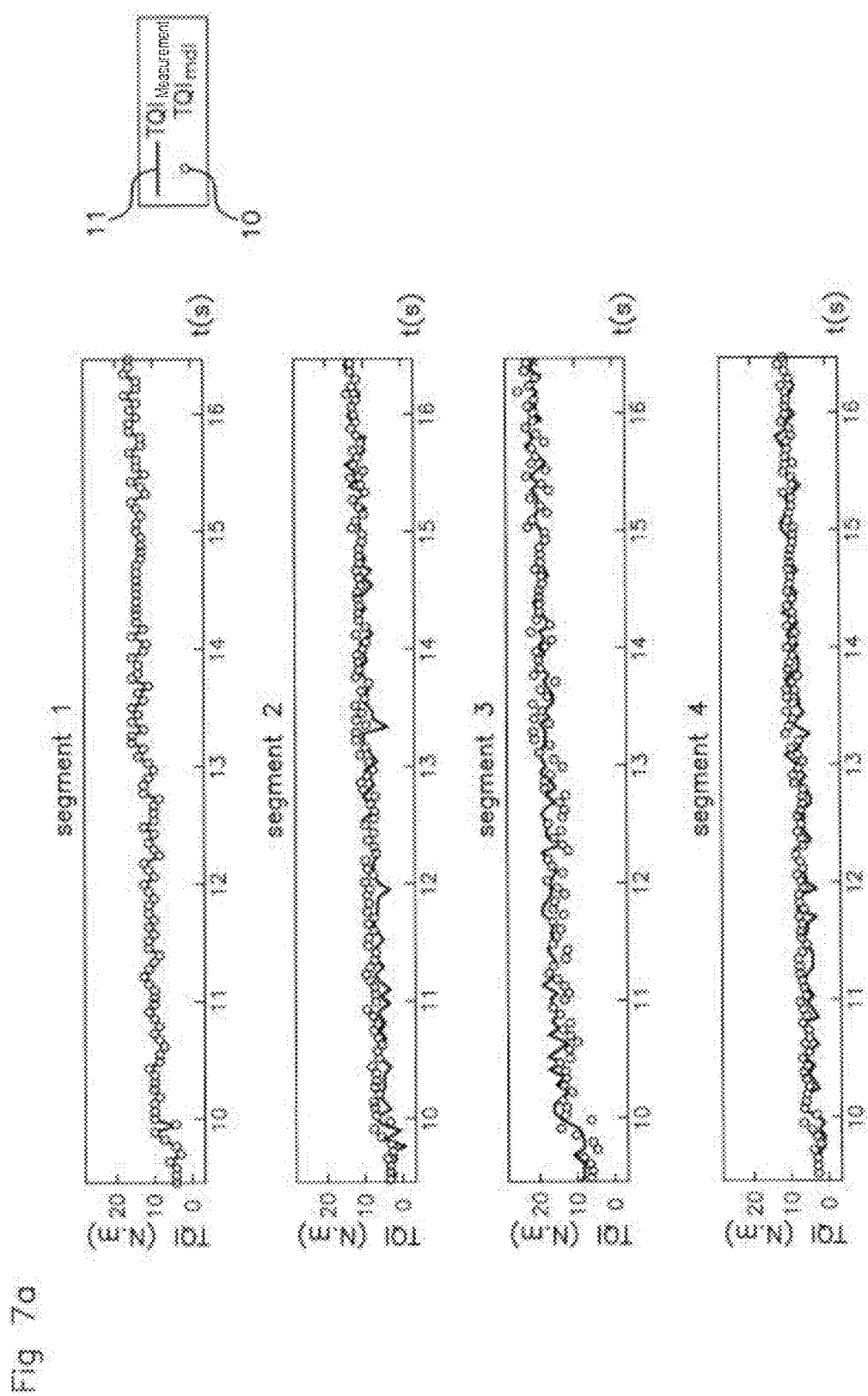
Figure 7B:
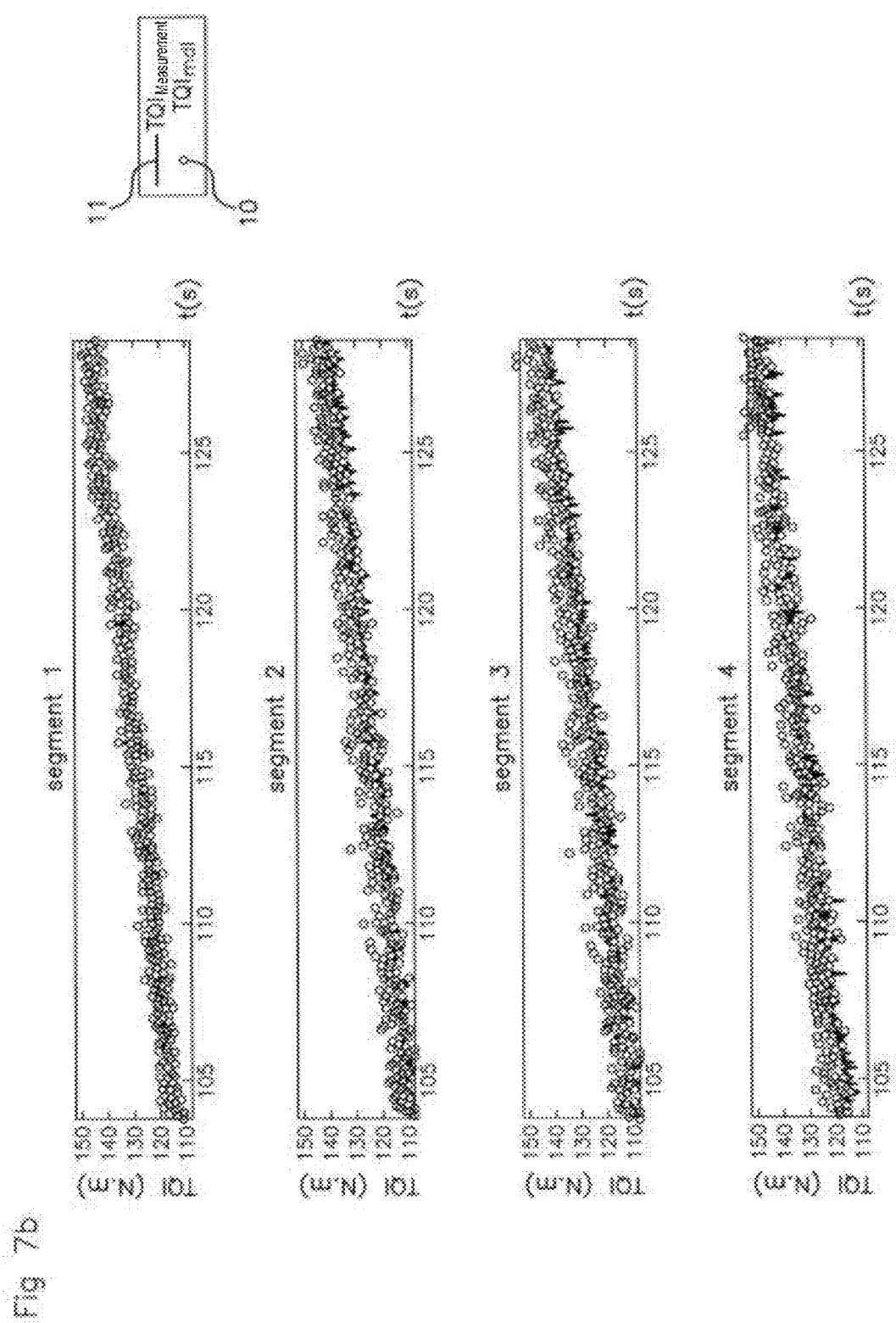
Figure 7C:
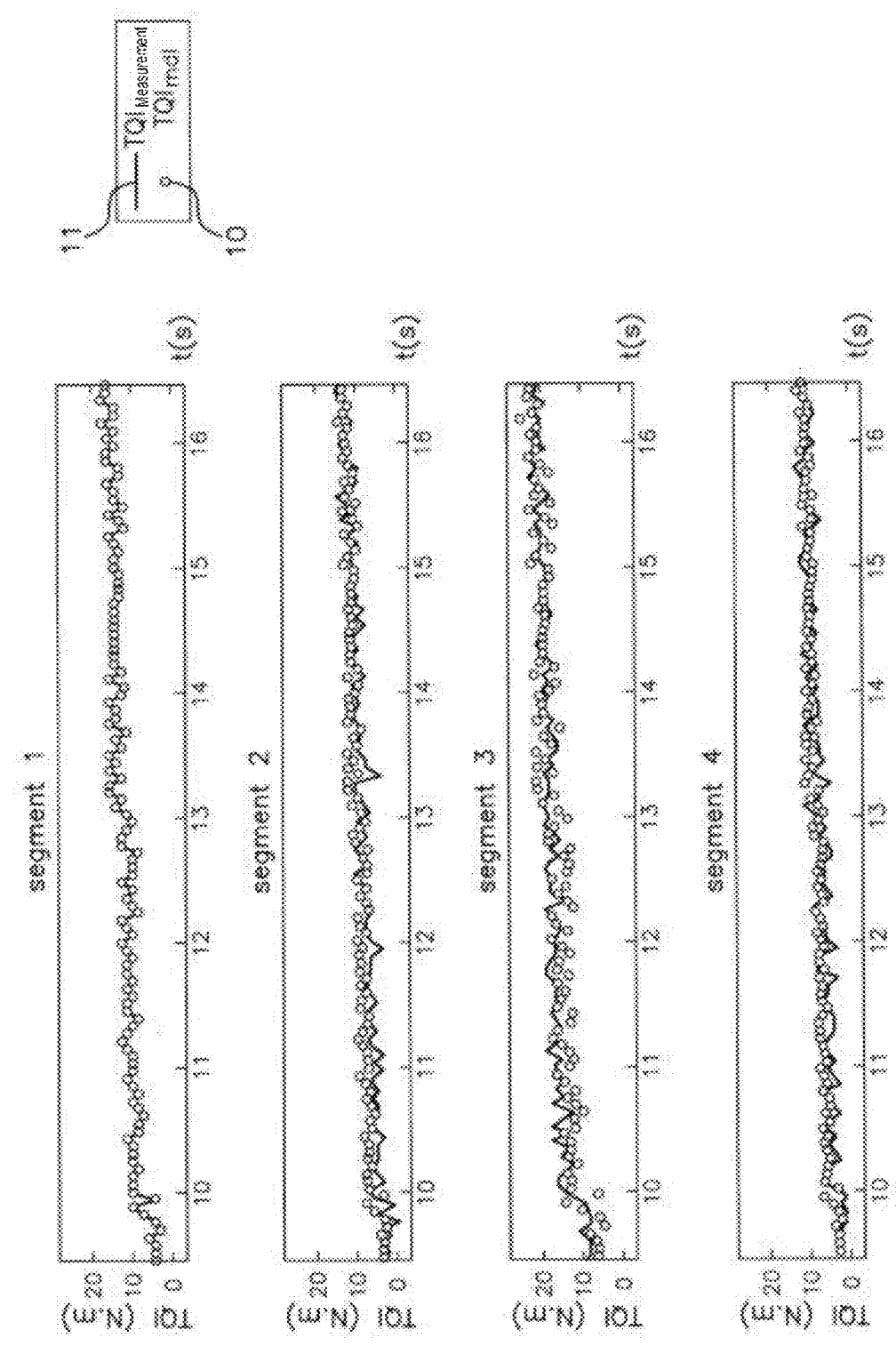

FIG. 1 is a basic diagram of an example of the method according to the invention, FIG. 2a shows schematically an example of engine speed $n_X^{filt}(i)$, that is $n_{ref}^{filt}(i)$ or $n_{cyl}^{filt}(i)$, at more than one turn of the crankshaft, obtained with reference to a sampled signal giving the angular position of the crankshaft, filtered by a moving average filter of order k, FIG. 2b shows schematically an example of engine speed $n_X^{osc}(i)$, at more than one turn of the crankshaft, obtained on the basis of the engine speed $n_X^{filt}(i)$ which is filtered in order to subtract from it the trend engine speed, thus defining the form of the oscillation of the engine speed for the tooth in a cycle of combustion for a given cylinder, FIG. 3 shows schematically an example of engine speed $n_X^{wind}(i)$ corresponding to a movable or dynamic angular window for measuring the cylinder pressure for which the engine speed $n_X^{osc}(i)$ is offset as a function of the engine speed, so that the minimum speed oscillation $n_X^{osc}(i)$ in the segment in question belongs to this angular window, FIG. 4a shows schematically an example of engine speed $n_X^{weight}(i)$, corresponding to the movable angular window according to the offset engine speed oscillation $n_X^{wind}(i)$, to which a filter is applied providing a dynamic width to the window, that is, whose width is variable and defined by filtering, proposing a truncation window for the speed oscillation $n_X^{wind}(i)$ in question, FIG. 4b shows in the form of diagrams, three examples of the form of the truncation window for the engine speed $n_X^{weight}(i)$, FIG. 5 shows schematically a general example of engine speed corrected, measured and estimated for each of the cylinders of an engine comprising $n_{cyl}(i)$ cylinders and $N_{Pcylsensor}$ pressure sensors, for more than one engine revolution, FIG. 6 illustrates schematically and in overall form a method according to the invention with the chronology in steps, as applied to the general example of FIG. 5, FIG. 7a shows schematically a comparative example for a four cylinder engine, between an engine torque obtained by measurement on the one hand and an engine torque obtained by means of a method according to the invention on the other hand, at 2000 rpm and for a low engine torque, FIG. 7b is similar to FIG. 7a, but for a medium engine torque, FIG. 7c is similar to FIG. 7a, but at 3000 rpm and for a low engine torque.

In FIGS. 1 to 4, the examples represent parameters coming from a four cylinder engine, only one cylinder of which is fitted with a cylinder pressure sensor 1. The engine comprises a crankshaft driven by pistons moving in the cylinders (not shown), and a sensor 2 for position of the crankshaft is provided to deliver a sampled signal representative of the angular position of the crankshaft.

FIG. 1 shows the oscillations of the engine speed. Each oscillation corresponds to a combustion cycle for a cylinder, and the successive oscillations represent the successive combustion cycles in the cylinders.

In the diagram of FIG. 1, the x-axis shows the time in seconds, and the y-axis the engine speed or velocity of rotation of the crankshaft in revolutions per minute, or rpm. The curve 4 representing several oscillations illustrates the velocity profile of the crankshaft after successive combustions of several cylinders. The points 3 on the curve 4 of FIG. 1 represent sampling points, for example corresponding to the sampling of the signal representative of the angular position of the crankshaft provided by the sensor 2.

The oscillation referenced as $Seg_{ref}$ corresponds to the oscillation for one cycle of combustion for the cylinder fitted with the cylinder pressure sensor. The oscillations referenced as $Seg_{n+1}$, $Seg_{n+2}$, and $Seg_{n+3}$ correspond to the oscillations for successive cycles of combustion respectively of the second, third, and fourth cylinders following the sequence of ignition, which are not fitted with a cylinder pressure sensor, and whose torque is respectively calculated based on the current transfer function as indicated below. The points 3 on the oscillation $Seg_{ref}$ correspond to sampling points of the cylinder pressure, and the points 3 of the oscillation referenced as $Seg_{n+1}$ correspond to sampling points of the signal representative of the angular position of the crankshaft provided by the sensor 2.

In FIG. 1, the term $TQI_{ref}$ symbolizes the fact that the value of the engine torque on the segment $Seg_{ref}$ is obtained by means of measuring the cylinder pressure, as shown by the representation of the cylinder pressure sensor 1 above the engine speed segment in question. The term $TQI_{mdl}$ symbolizes the fact that the value of the engine torque on the segment $Seg_{n+1}$ is obtained by means of an estimation with the transfer function for learning the engine torque and the signal of the sensor 2 of the crankshaft position, as explained below, and as shown by the representation of the sensor 2 of the crankshaft position above the engine speed segment $Seg_{n+1}$ in question.

We shall now describe an example of the method of determination of the engine torque according to the invention with the aid of FIG. 1. The method comprises the following steps:

Step 1: one determines in known manner the angular velocity of the crankshaft in an angular window $Seg_{ref}$ comprising the combustion in a current engine cycle of a first cylinder fitted with a cylinder pressure sensor, for example as illustrated in FIG. 1, based on a sampling of measurement points 3, in a segment or window $Seg_{ref}$, furnished by the sensor of angular position of the crankshaft. That is, for each point 3 giving a position of the crankshaft, one determines the instantaneous velocity of the crankshaft at that point;

Step 2: one measures the cylinder pressure in this first cylinder fitted with a cylinder pressure sensor, in the angular window of step 1, as defined in FIG. 1 by the reference $Seg_{ref}$ corresponding in the example to a period of rotation of the crankshaft of two hundredths of a second (0.02 s), for example for each measurement point 3 and at the same time as the calculation of the instantaneous velocity of the crankshaft;

Step 3: one then calculates, via the engine control unit, the value of the indicated engine torque $TQI_{ref}$ which is generated in the angular window $Seg_{ref}$ of step 1 in the current engine cycle of the first cylinder, for example based on the information as to pressure obtained from the cylinder pressure sensor. The determination of the indicated engine torque $TQI_{ref}$ by means of a cylinder pressure sensor is known to the person skilled in the art and is mentioned further below;

Step 4: one then determines, via the engine control unit, a current transfer function for learning of the engine torque, so as to estimate the indicated engine torque $TQI_{mdl}$ in at least one second cylinder not fitted with a cylinder pressure sensor, following the first cylinder in the direction of rotation of the crankshaft, i.e., for the engine cycle following that of the first cylinder, based on the product of:
  the indicated engine torque $TQI_{ref}$ calculated for said angular window $Seg_{ref}$ in said current engine cycle of the first cylinder, and a ratio between:
    the angular velocity $n_{cyl}(i)$ of the crankshaft in an angular window $Seg_{n+1}$ comprising the combustion in a current engine cycle of the second cylinder following said current engine cycle of the first cylinder, and
    the angular velocity $n_{ref}(i)$ of the crankshaft in said angular window $Seg_{ref}$ comprising the combustion in said current engine cycle of the first cylinder;

Step 5: one then applies this current transfer function for learning of the engine torque to a second cylinder, not fitted with a cylinder pressure sensor, following the first cylinder in the direction of rotation of the crankshaft, for which FIG. 1 shows the corresponding speed oscillation resulting from the cycle of combustion, in the angular window $Seg_{n+1}$ whose aperture angle is similar to the angular window $Seg_{ref}$ of step 1 and which is measured by means of the signal representative of the angular position of the crankshaft, thus comprising the combustion of the second cylinder. This allows an estimation of the engine torque generated by the second cylinder in a current engine cycle following the current engine cycle of the first cylinder. This current transfer function for learning of the engine torque is thus usable for each engine cycle of a cylinder not fitted with a cylinder pressure sensor, following the first cylinder, in the example: $Seg_{n+2}$ $Seg_{n+3}$ up to the next engine cycle of a cylinder fitted with a cylinder pressure sensor, or in the example, the first cylinder $Seg_{ref}$. It will be noted that the sampling for determination of the engine torque resulting from a measurement of the cylinder pressure or estimated according to the invention by means of a transfer function, is advantageously the same in all the cylinders, since it results from the sampling of the signal representative of the angular position of the crankshaft coming from the position sensor 2;

Step 6: then, when once again a combustion occurs in the first cylinder fitted with a cylinder pressure sensor, and more generally during the next engine cycle of a cylinder fitted with a cylinder pressure sensor, one updates or refreshes said current transfer function for learning of the engine torque by reiterating steps 1 to 4 above, so as to establish a new current transfer function in order to estimate a new current reference engine torque as per step 5.

Preferably, the current transfer function for learning of the engine torque is given by the following formula:

$$TQI_{mdl}(cyl) = TQI_{ref} f(N, Cyl_{nr}, TQI_{ref}) \frac{\sum_{i=1}^{i=nb_{tooth}} n_{cyl}(i)}{\sum_{i=1}^{i=nb_{tooth}} n_{ref}(i)} \quad (1)$$

where:
  $TQI_{mdl}(cyl)$ is the estimated engine torque for the second, third and fourth cylinders not fitted with a cylinder pressure sensor, in the angular windows $Seg_{n+1}$, $Seg_{n+2}$, and $Seg_{n+3}$ comprising the combustion of the current engine cycle and corresponding to the incident oscillation of the engine speed in these windows $Seg_{n+1}$, $Seg_{n+2}$, and $Seg_{n+3}$,
  $TQI_{ref}$ is the current reference engine torque measured on said first cylinder fitted with a cylinder pressure sensor, in the angular window $Seg_{ref}$ comprising the combustion of the current engine cycle and corresponding to the incident oscillation of the engine speed in this window $Seg_{ref}$, $nb_{tooth}$ is the number of teeth of the position sensor of the crankshaft, $n_{cyl}(i)$ is the engine speed obtained with reference to a sampled signal showing the angular position of the crankshaft, taken at the measurement point of index i in the angular windows $Seg_{n+1}$, $Seg_{n+2}$, and $Seg_{n+3}$ respectively of the second, third and fourth cylinders, $n_{ref}(i)$ is the engine speed obtained with reference to the sampled signal showing the angular position of the crankshaft, taken at the measurement point of index in the angular window $Seg_{ref}$ of the first cylinder.

$f(N, Cyl_{nr}, TQI_{ref})$ represents said correction function, being a function of the current engine speed N, and/or the number $Cyl_{nr}$ of cylinders in question of the engine, representing its position in relation to the crankshaft, and/or the current reference engine torque or indicated torque $TQI_{ref}$.

We recall that the value of the indicated engine torque $TQI_{ref}$ which is generated in the angular window $Seg_{ref}$ of step 1 is calculated via the engine control unit, based on the pressure information obtained from the cylinder pressure sensor, for example, by the following expression:

$$\frac{\int_{\theta=0}^{\theta=720} Pcyl(\theta) \frac{dvol(\theta)}{d\theta} d\theta}{4\pi}$$

where:
$Pcyl(\theta)$ is the pressure in the cylinder taken at a given angular position $\theta$ of the crankshaft, $$\frac{dvol(\theta)}{d\theta}$$

is the elementary unit variation of volume in the cylinder,
The quantity $$Pcyl(\theta) \frac{dvol(\theta)}{d\theta}$$

being integrated over one rotation of the crankshaft of 720°.

Preferably, prior to application of the current transfer function for learning of the engine torque, as represented in FIG. 2a, a first filter is applied to the engine speed $n_{ref}(i)$ obtained by reference to the sampled signal giving the angular position of the crankshaft, taken at the measurement point of index i in the angular window $Seg_{ref}$ of the first cylinder, as well as at the engine speed $n_{cyl}(i)$ obtained with reference to the sampled signal giving the angular position of the crankshaft, taken at the measurement point of index i in the angular windows $Seg_{n+1}$ $Seg_{n+2}$, and $Seg_{n+3}$ respectively of the second, third and fourth cylinders. The signal obtained for the engine speeds $n_{ref}(i)$ and $n_{cyl}(i)$ designated by a common reference $n_X^{filt}(i)$ in the following expression, is thus filtered by a moving average filter of order k, defined as follows:

$$n_X^{filt}(i) = \frac{\sum_{k=1}^{k=order\ of\ the\ filter} a_k n_X(i-k) + a_0 n_X(i) + \sum_{k=1}^{k=order\ of\ the\ filter} a_k n_X(i+k)}{a_0 + 2 \sum_{k=1}^{k=order\ of\ the\ filter} a_k}$$

where:
$n_X^{filt}(i)$ is the engine speed $n_{ref}(i)$ or $n_{cyl}(i)$, filtered at each tooth i, $n_X(i)$ is the engine speed $n_{ref}(i)$ or $n_{cyl}(i)$ at each tooth i, $a_k$ is the weight of the contribution to the filtering, defined a priori as being a function of the signal to noise ratio of the raw signal $n_X(i)$, k is the order of the filter, i is the tooth in question of the position sensor, and corresponds to the measurement point of index i.

FIG. 2a shows by the curve 20 the signal $n_X(i)$ of the engine speed obtained from the sensor 2, and by the curve 21 the signal $n_{ref}^{filt}(i)$ or $n_{cyl}^{filt}(i)$ filtered by the filter described above. The physical quantities on the x-axis and the y-axis are respectively the same as those in FIG. 1, or the engine speed in revolutions per minute or rpm on the y-axis, and the time in seconds on the x-axis.

Preferably, as represented in FIG. 2b, before application of the current transfer function for learning of the engine torque, a second filter is applied to the engine speeds $n_{ref}(i)$ and $n_{cyl}(i)$ obtained with reference to the sampled signal giving the angular position of the crankshaft. With this second filter, the engine speeds $n_{ref}^{filt}(i)$ and $n_{cyl}^{filt}(i)$ obtained as described above are filtered in order to subtract from them the general trend engine speed, according to the following respective expressions:

$$n_{ref}^{osc}(i) = n_{ref}^{filt}(i) - n_{ref}^{trend}(i) \text{ and}$$

$$n_{cyl}^{osc}(i) = n_{cyl}^{filt}(i) - n_{cyl}^{trend}(i)$$

which can be written in general form by the following expression:

$$n_X^{osc}(i) = n_X^{filt}(i) - n_X^{trend}(i)$$

where:
$n_X^{osc}(i)$ is the form of the oscillation of the engine speed $n_X^{filt}(i)$ for the tooth i in a combustion cycle for a given cylinder, $n_X^{trend}(i)$ is the engine speed obtained for the tooth i, corresponding to the lower dead center, representing the trend engine speed, $n_X^{filt}(i)$ having been defined above.

In FIG. 2b, the curve 22 represents the engine speed $n_X^{filt}(i)$ and the curve 23 represents the engine speed $n_X^{osc}(i)$. The curve 24 represents the engine speed $n_X^{trend}(i)$ which has been subtracted from the engine speed $n_X^{filt}(i)$ so as to keep only the form of the oscillations of engine speed. On the x-axis is represented the time in seconds, and on the y-axis the engine speed in revolutions per minute, rpm. The terms $TDC_1$, $TDC_2$, $TDC_3$, and $TDC_4$ indicate respectively the upper dead centers of compression of the first, second, third, and fourth cylinders, respectively.

Preferably, as shown in FIG. 3, a third filter is applied to the sampled signal coming from the sensor of angular position of the crankshaft, before application of the transfer function for learning of the engine torque. This third filter consists in that said angular window for measurement of the cylinder pressure for which the engine speed $n_X^{osc}(i)$ is obtained as described above, is offset as a function of the engine speed, so that the minimum speed oscillation $n_X^{osc}(i)$ in the segment in question belongs to this window, according to the following expression:

$$n_X^{wind}(i) = n_X^{osc}(i - x_{tooth})$$

where:
$n_X^{wind}(i)$ represents the speed oscillation offset by $x_{tooth}$ teeth and windowed such that the tooth i is comprised between 1 and $nb_{tooth}$, $x_{tooth}$ is the number of teeth offset before or after the upper dead center position of compression TDC, the minimum engine speed in the angular window in question not always being positioned at the upper dead center position of compression TDC: $x_{tooth}=\epsilon(N,TQI_{ref})$ depends on the current engine speed N and on the indicated torque $TQI_{ref}$, $n_X^{osc}(i)$ having been defined above.

This characteristic proposes a dynamic or movable measurement window for the cylinder pressure as a function of the indicated engine torque and of the engine speed, such that the minimum speed $n_X^{osc}(i)$ is placed at the start of the analysis window $n_X^{wind}(i)$.

FIG. 3 shows an example of such an offset. The top diagram shows the speed $n_X^{osc}(i)$ under the reference 5 in a fixed measurement window 25 not offset. The bottom diagram shows the speed $n_X^{wind}(i)$ under the reference 6 which is effectively considered by an offset measurement window 26 such that the minimum speed oscillation $n_X^{osc}(i)$ belongs to this window 26. In the two diagrams, the x-axis shows the time in seconds, and the y-axis shows the engine speed in revolutions per minute, or rpm. In FIG. 3, the vertical dotted lines 27 and 28 in the top diagram define the fixed window 25, and the vertical dotted lines 29 and 30 in the bottom diagram define the dynamic window 26.

The number of offset teeth $x_{tooth}$ is illustrated in the bottom diagram of FIG. 3, between the vertical dotted lines 27 and 29. This number of offset teeth is a function of the speed of rotation of the crankshaft and of the indicated torque, such that the minimum speed $n_X^{osc}(i)$ is placed at the start of the analysis window $n_X^{wind}(i)$.

Preferably, as shown in FIGS. 4a and 4b, a fourth filter is applied to the sampled signal coming from the sensor of angular position of the crankshaft, before application of the transfer function for learning of the engine torque. This fourth filter consists in that said movable angular window, offset according to the speed oscillation $n_X^{wind}(i)$, furthermore has a dynamic width, defined by the following expression:

$$n_X^{weight}(i)=\gamma(i,N,GEAR,TQI_{ref})n_X^{wind}(i)$$

where:

$n_X^{weight}(i)$ is the speed oscillation in question for the engine segment obtained by truncating the window applied by the function $\gamma(i,N,GEAR,TQI_{ref})$, for the cylinder fitted with a cylinder pressure sensor, $\gamma(i,N,GEAR,TQI_{ref})$ is the form of the truncation window as a function of the current engine speed N, the engaged gearbox ratio GEAR, and the current reference engine torque or indicated torque $TQI_{ref}$ measured for said first cylinder fitted with a cylinder pressure sensor, $n_X^{wind}(i)$ having been defined above.

With this fourth filter depending on the form of the oscillation $n_X^{wind}(i)$ of the engine speed, the form of the truncation window $n_X^{weight}(i)$ of the engine speed can be redefined in order to achieve a more robust signal processing and, consequently, an increased final precision for the estimated engine torque. This filter constitutes a fourth processing step for the sampled signal coming from the sensor of the angular position of the crankshaft, before application of the transfer function for learning of the engine torque.

FIG. 4a shows an oscillation 7 of the engine speed, $n_{ref}^{wind}(i)$, $n_{cyl}^{wind}(i)$, and the curve 8 the truncated signal corresponding to the dynamic width Ld of truncation applied to the speed window $n_{ref}^{wind}(i)$ or $n_{cyl}^{wind}(i)$ of width Lw. Some of the measurement points 3 have been eliminated at the start and end of the speed window $n_{ref}^{wind}(i)$ or $n_{cyl}^{wind}$ (i). In fact, for certain engine configurations, such as a five-cylinder engine operating in a four-stroke cycle, cross interference effects between the cylinders may appear; this filter makes it possible to eliminate these interference effects from the processed signal, if need be.

FIG. 4b shows three examples of the form $\gamma(i,N,GEAR,TQI_{ref})$ of the truncation window, or from lowermost to uppermost a Gaussian form 40, a triangular form 41, a square form 42, making it possible to adapt the form of the truncation window to the cross interference effects as needed.

Preferably, the initial angular window for the measurement of the pressure signal corresponding to the combustion in a current engine cycle of the first cylinder is defined by an angular interval equal to 360°, distributed from −180° before the TDC to +180° after the upper dead center of compression, or TDC.

Preferably, the engine torque generated in the angular windows $Seg_{n+1}$, $Seg_{n+2}$, and $Seg_{n+3}$, estimated for the second, third and fourth cylinders not fitted with a cylinder pressure sensor, is thus obtained according to the following expression:

$$TQI_{mdl}(cyl) = TQI_{ref} \times f(N, Cyl_{nr}, TQI_{ref}) \times \frac{\sum_{i=1}^{i=nb_{tooth}} n_{cyl}^{weight}(i)}{\sum_{i=1}^{i=nb_{tooth}} n_{ref}^{weight}(i)} \quad (2)$$

Expression (2) is obtained from expression (1) described above, the engine speeds $n_{ref}(i)$ and $n_{cyl}(i)$ have been replaced by the filtered speeds $n_{cyl}^{weight}(i)$ and $n_{ref}^{weight}(i)$ as described above.

FIG. 5 shows a diagram where the quantities of the x-axis and y-axis are identical to those of FIG. 1, respectively, and illustrates a curve 4 of continuous velocity profile of the crankshaft resulting from successive combustions in the successive cylinders of the engine. Each speed oscillation associated with a parenthesis on the x-axis represents the contribution of the combustion of a cylinder to an engine cycle at an angle of rotation of the crankshaft of 720°, divided by the number of engine cylinders illustrated by the reference $N_{cyl}$.

FIG. 5 shows a generalization of the method described with an engine having $N_{cyl}$ cylinders and $N_{Pcylsensor}$ pressure sensors, given that a cylinder, if having a pressure sensor, will only have one thereof.

In this FIG. 5, each engine speed oscillation furthermore has, surrounded by a square, a reference to the filtered engine speed $n_{ref}^{weight}$ in the mentioned cylinders $Cyl_{ref}$ having a cylinder pressure sensor, and a reference to the engine speed $n_{cyl}^{weight}$ in the mentioned cylinders $Cyl_{ref+1} \ldots$ $$Cyl_{ref} = \frac{N_{cyl}-1}{N_{Pcylsensor}}$$

not having a cylinder pressure sensor.

The following term:

$$Cyl_{ref} = \frac{N_{cyl}-1}{N_{Pcylsensor}}$$

designates the last cylinder of the engine whose engine torque is estimated, and which is not fitted with a cylinder pressure sensor, subsequent to a cylinder fitted with a cylinder pressure sensor, on the basis of which the current transfer function for learning of the engine torque is valid prior to being updated as of the next cylinder $Cyl_{ref}$ of the engine fitted with a cylinder pressure sensor. The engine of FIG. 5 comprises $N_{Pcylsensor}$ sensors of cylinder pressure, given that a cylinder can only have one cylinder pressure sensor. As shown in FIG. 5, an engine speed oscillation takes place in one hundredth of a second. The terms $TQI_{ref}$ opposite the parentheses confirm the presence in the corresponding cylinders $Cyl_{ref}$ of a cylinder pressure sensor for which the transfer function for learning of the engine torque is updated or refreshed.

FIG. 6 represents in a schematic and graphic fashion a chronology of the different steps of the example of the method described above with the aid of FIGS. 1 to 5, taken altogether. On each row of the diagram, one finds the processing applied to each engine cylinder, respectively. In each column of the diagram, one finds the processing steps applied to the signal of the cylinder pressure sensor Pcylsensor, chronologically from left to right, and to the signal of the position sensor CRKsensor, chronologically from right to left. The blocks show the steps of the method or the results obtained, as indicated. The arrows in the diagram between the blocks indicate the order of occurrence of the steps.

In FIG. 6, for example for the first cylinder (row 30 at the top of the diagram), from right to left, we find the signal $n_{ref}(i)$ of the engine speed transmitted by the crankshaft position sensor $CRK_{sensor}$, and then the successive processings 35 of this signal as described with the aid of FIGS. 2 to 4, in order to furnish the signal $n_{ref}^{weight}(i)$ of which will be inserted into the expression (2) described above and illustrated in the block 36 for the estimated torque of the second cylinder (row 31). Again for the first cylinder, first row 30, we find at the left of the diagram the cylinder pressure signal Pcyl making it possible to calculate the indicated torque $TQI_{ref}$, which is itself also inserted into the expression (2) described above and illustrated in the block 36 for the estimated torque of the second cylinder (row 31).

Finally, on the second row 31 we find the signal $n_{cyl}(i)$ of engine speed transmitted by the crankshaft position sensor $CRK_{sensor}$, and then the successive processings 37 of this signal as described with the aid of FIGS. 2 to 4, in order to provide the signal $n_{cyl}^{weight}(i)$ which will be inserted into the expression (2) described above and illustrated in the block 36 for the estimated torque of the second cylinder (row 31).

In FIG. 6, the same method as that for row 31 is applied to the third cylinder cyl 3 and fourth cylinder cyl 4, which do not have any cylinder pressure sensors, as represented on rows 32 and 33, in order to obtain the signals $n_{cyl(3)}^{weight}(i)$ and $n_{cyl(4)}^{weight}(i)$ respectively, which will be inserted into the expression (2) described above and illustrated in the block 36 in order to obtain the estimated torque for the third cylinder cyl 3 and fourth cylinder cyl 4.

Row 34 represents the first cylinder which returns, in the chronology of combustions, after the first cylinder cyl 1 illustrated on row 30, and which is fitted with a cylinder pressure sensor, for example, the first cylinder for a four-cylinder engine having a single cylinder pressure sensor. Row 34 is thus a repeat of row 30, and the transfer function of the block 36, row 31, is re-updated with the new indicated torque $TQI_{ref}$ obtained from the cylinder pressure sensor.

FIGS. 7a, 7b, 7c represent tests aimed at showing the effectiveness of a method according to the invention as described above in a four-cylinder engine.

More precisely, FIGS. 7a, 7b, 7c show respectively experimental results of engine torques $TQI_{mdl}$ estimated by a method as described above, and obtained for an engine speed of 2000 revolutions per minute at low demanded engine torque (FIG. 7a), 2000 revolutions per minute in medium demanded engine torque interval (FIG. 7b), and 3000 revolutions per minute at low demanded engine torque (FIG. 7c).

In each FIG. 7a, 7b, 7c there are shown separately the four diagrams of the engine torque contributed by each of the four cylinders, corresponding to the diagrams "segment 1", "segment 2", "segment 3" and "segment 4". In each diagram, the points 10 represent the modeled torque $TQI_{mdl}$, and the continuous line 11 shows the compared and measured torque $TQI_{measurement}$ obtained from a cylinder fitted with a cylinder pressure sensor as explained above. In FIGS. 7a, 7b, 7c, $TQI_{measurement}$ corresponds to the $TQI_{ref}$ as described above. In each diagram, we find on the x-axis the time in seconds and on the y-axis the value of the engine torque $TQI_{mdl}$ or $TQI_{measurement}$ in Newton meters, N·m. One will note a remarkable correlation between the modeled torque as described above and the measured torque, showing the great precision of the method according to the present invention.

The invention claimed is:

1. A method for determining the engine torque delivered by a multi-cylinder engine, comprising at least one cylinder fitted with a cylinder pressure sensor and at least one cylinder not fitted with a cylinder pressure sensor, said engine comprising a crankshaft driven by pistons moving in the cylinders, and means of determining the velocity of the crankshaft, wherein the method comprises the following steps:

Step 1: determining the angular velocity of the crankshaft over an angular window ($Seg_{ref}$) comprising the combustion in a current engine cycle of a first cylinder fitted with a cylinder pressure sensor, Step 2: measuring the cylinder pressure over said angular window ($Seg_{ref}$) in said current engine cycle of the first cylinder, Step 3: calculating the value of the indicated engine torque ($TQI_{ref}$) in said angular window in said current engine cycle of the first cylinder, based on said measured cylinder pressure, Step 4: determining a current transfer function for the learning of the engine torque, so as to estimate the indicated engine torque ($TQI_{mdl}$(cyl)) in at least a second cylinder not fitted with a cylinder pressure sensor, following said first cylinder in the direction of rotation of the crankshaft, from the product of:
  the indicated engine torque ($TQI_{ref}$) calculated over said angular window ($Seg_{ref}$) in said current engine cycle of the first cylinder, and
  a ratio between:
    the angular velocity ($n_{cyl}(i)$) of the crankshaft over an angular window ($Seg_{n+1}$) comprising the combustion in a current engine cycle of the second cylinder, following said current engine cycle of the first cylinder, and
    the angular velocity ($n_{ref}(i)$) of the crankshaft over said angular window ($Seg_{ref}$) comprising the combustion in said current engine cycle of the first cylinder;

Step 5: applying said current transfer function for learning of the engine torque to each engine cycle of a cylinder not fitted with a cylinder pressure sensor, following said first cylinder, until the next engine cycle of a cylinder fitted with a cylinder pressure sensor;

Step 6: updating said current transfer function for learning of the engine torque, reiterating the preceding steps until determining a new current transfer function for learning of the engine torque, during said next engine cycle of a cylinder fitted with a cylinder pressure sensor.

2. The method as claimed in claim 1, wherein said angular window corresponding to the combustion in a current engine cycle of said first cylinder is defined by an angular interval equal to 360°, distributed from −180° before the upper dead center of compression to +180° after the upper dead center of compression.

3. The method as claimed in claim 1, wherein said current transfer function for learning of the engine torque is given by the following expression:

$$TQI_{mdl}(cyl) = TQI_{ref} \frac{\sum_{i=1}^{i=nb_{tooth}} n_{cyl}(i)}{\sum_{i=1}^{i=nb_{tooth}} n_{ref}(i)}$$

where:
- $TQI_{mdl}(cyl)$ is the estimated engine torque for said second cylinder not fitted with a cylinder pressure sensor, in the angular window $Seg_{n+1}$ comprising the combustion of the current engine cycle and corresponding to the incident oscillation of the engine speed in this window $Seg_{n+1}$,
- $TQI_{ref}$ is the current reference engine torque measured on said first cylinder fitted with a cylinder pressure sensor, in the angular window $Seg_{ref}$ comprising the combustion of the current engine cycle and corresponding to the incident oscillation of the engine speed in this window $Seg_{ref}$,
- $nb_{tooth}$ is the number of teeth of the position sensor of the crankshaft,
- $n_{cyl}(i)$ is the engine speed obtained with reference to a sampled signal showing the angular position of the crankshaft, taken at the measurement point of index i in the angular window $Seg_{n+1}$ of the second cylinder,
- $n_{ref}(i)$ is the engine speed obtained with reference to the sampled signal showing the angular position of the crankshaft, taken at the measurement point of index i in the angular window $Seg_{ref}$ of the first cylinder.

4. The method as claimed in claim 3, wherein said angular window corresponding to the combustion in a current engine cycle of said first cylinder is defined by an angular interval equal to 360°, distributed from −180° before the upper dead center of compression to +180° after the upper dead center of compression.

5. The method as claimed in claim 3, wherein one introduces a correction function $f(N, Cyl_{nr}, TQI_{ref})$ in order to define said current transfer function for the learning of the engine torque, as claimed in the following expression:

$$TQI_{mdl}(cyl) = TQI_{ref} f(N, Cyl_{nr}, TQI_{ref}) \frac{\sum_{i=1}^{i=nb_{tooth}} n_{cyl}(i)}{\sum_{i=1}^{i=nb_{tooth}} n_{ref}(i)}$$

where:
- $f(N, Cyl_{nr}, TQI_{ref})$ represents said correction function, which is a function of the current engine speed (N), and/or of the number ($Cyl_{nr}$) of cylinders in question for the engine, representing its position in relation to the crankshaft, and/or the current reference engine torque or indicated torque ($TQI_{ref}$).

6. The method as claimed in claim 5, wherein said angular window corresponding to the combustion in a current engine cycle of said first cylinder is defined by an angular interval equal to 360°, distributed from −180° before the upper dead center of compression to +180° after the upper dead center of compression.

7. The method as claimed in claim 6, wherein the indicated engine torque which is estimated for said second cylinder not fitted with a cylinder pressure sensor, is obtained by the following expression:

$$TQI_{mdl}(cyl) = TQI_{ref} \times f(N, Cyl_{nr}, TQI_{ref}) \times \frac{\sum_{i=1}^{i=nb_{tooth}} n_{cyl}^{weight}(i)}{\sum_{i=1}^{i=nb_{tooth}} n_{ref}^{weight}(i)}.$$

8. The method as claimed in claim 5, wherein the engine speed $n_{ref}(i)$ obtained with reference to the sampled signal showing the angular position of the crankshaft, taken at the measurement point of index i in the angular window $Seg_{ref}$ of the first cylinder, or in an angular window $Seg_{n+1}$ of the second cylinder, is filtered by a moving average filter of order k, defined as follows:

$$n_X^{filt}(i) = \frac{\sum_{k=1}^{k=order\,of\,the\,filter} a_k n_X(i-k) + a_o n_X(i) + \sum_{k=1}^{k=order\,of\,the\,filter} a_k n_X(i+k)}{a_o + 2 \sum_{k=1}^{k=order\,of\,the\,filter} a_k}$$

where:
- $n_X^{filt}(i)$ is the engine speed $n_{ref}(i)$ or $n_{cyl}(i)$, filtered at each tooth i,
- $n_X(i)$ is the engine speed $n_{ref}(i)$ or $n_{cyl}(i)$ at each tooth i,
- $a_k$ is the weight of the contribution to the filtering, defined a priori as being a function of the signal to noise ratio of the raw signal $n_X(i)$,
- k is the order of the filter,
- i is the tooth in question of the position sensor, and corresponds to the measurement point of index i.

9. The method as claimed in claim 8, wherein the engine speed $n_X^{filt}(i)$ obtained is filtered in order to subtract from it the trend engine speed, as claimed in the expression:

$$n_X^{osc}(i) = n_X^{filt}(i) - n_X^{trend}(i)$$

where:
- $n_X^{osc}$ is the form of the oscillation of the engine speed $n_X^{filt}(i)$ for the tooth i in a combustion cycle for a given cylinder,
- $n_X^{trend}(i)$ is the engine speed obtained for the tooth i, corresponding to the lower dead center, representing the trend engine speed.

10. The method as claimed in claim 8, wherein said angular window corresponding to the combustion in a current engine cycle of said first cylinder is defined by an angular interval equal to 360°, distributed from −180° before the upper dead center of compression to +180° after the upper dead center of compression.

11. The method as claimed in claim 3, wherein the engine speed $n_{ref}(i)$ obtained with reference to the sampled signal showing the angular position of the crankshaft, taken at the measurement point of index i in the angular window $Seg_{ref}$ of the first cylinder, or in an angular window $Seg_{n+1}$ of the second cylinder, is filtered by a moving average filter of order k, defined as follows:

$$n_X^{filt}(i) = \frac{\sum_{k=1}^{k=order\,of\,the\,filter} a_k n_x(i-k) + a_o n_x(i) + \sum_{k=1}^{k=order\,of\,the\,filter} a_k n_x(i+k)}{a_o + 2 \sum_{k=1}^{k=order\,of\,the\,filter} a_k}$$

where:
- $n_X^{filt}(i)$ is the engine speed $n_{ref}(i)$ or $n_{cyl}(i)$, filtered at each tooth i,
- $n_X(i)$ is the engine speed $n_{ref}(i)$ or $n_{cyl}(i)$ each tooth i,
- $a_k$ is the weight of the contribution to the filtering, defined a priori as being a function of the signal to noise ratio of the raw signal $n_X(i)$,
- k is the order of the filter,
- i is the tooth in question of the position sensor, and corresponds to the measurement point of index i.

12. The method as claimed in claim 11, wherein said angular window corresponding to the combustion in a current engine cycle of said first cylinder is defined by an angular interval equal to 360°, distributed from −180° before the upper dead center of compression to +180° after the upper dead center of compression.

13. The method as claimed in claim 11, wherein the engine speed $n_X^{filt}(i)$ obtained is filtered in order to subtract from it the trend engine speed, as claimed in the expression:

$$n_X^{osc}(i) = n_X^{filt}(i) - n_X^{trend}(i)$$

where:
- $n_X^{osc}(i)$ is the form of the oscillation of the engine speed $n_X^{filt}(i)$ for the tooth i in a combustion cycle for a given cylinder,
- $n_X^{trend}(i)$ is the engine speed obtained for the tooth i, corresponding to the lower dead center, representing the trend engine speed.

14. The method as claimed in claim 13, wherein said angular window corresponding to the combustion in a current engine cycle of said first cylinder is defined by an angular interval equal to 360°, distributed from −180° before the upper dead center of compression to +180° after the upper dead center of compression.

15. The method as claimed in claim 13, wherein said angular window for measurement of the cylinder pressure for which the engine speed $n_X^{osc}(i)$ is obtained as claimed in the preceding characteristic, is offset as a function of the engine speed, such that the minimum speed oscillation in the segment in question belongs to this window, as claimed in the following expression:

$$n_X^{wind}(i) = n_X^{osc}(i - x_{tooth})$$

where:
- $n_X^{wind}(i)$ represents the speed oscillation offset by $x_{tooth}$ teeth and windowed such that the tooth i is comprised between 1 and $nb_{tooth}$,
- $x_{tooth}$ is the number of teeth offset before or after the upper dead center position of compression TDC, the minimum engine speed in the angular window in question not always being positioned at the upper dead center position of compression TDC: $x_{tooth} = \varepsilon(N, TQI_{ref})$ depends on the current engine speed N and on the indicated torque ($TQI_{ref}$).

16. The method as claimed in claim 15, wherein said angular window corresponding to the combustion in a current engine cycle of said first cylinder is defined by an angular interval equal to 360°, distributed from −180° before the upper dead center of compression to +180° after the upper dead center of compression.

17. The method as claimed in claim 15, wherein said angular window as claimed in the offset speed oscillation $n_{ref}^{weight}(i)$ has a dynamic width, defined by the following expression:

$$n_X^{weight}(i) = \gamma(i, N, GEAR, TQI_{ref}) n_X^{wind}(i)$$

where:
- $n_X^{weight}(i)$ is the speed oscillation for the engine segment obtained by truncating the window applied by the function $\gamma(i, N, GEAR, TQI_{ref})$, for the cylinder fitted with a cylinder pressure sensor,
- $\gamma(i, N, GEAR, TQI_{ref})$ is the form of the truncation window as a function of the current engine speed (N), the engaged gearbox ratio (GEAR), and the current reference engine torque or indicated torque ($TQI_{ref}$) measured for said first cylinder fitted with a cylinder pressure sensor.

18. The method as claimed in claim 17, wherein said angular window corresponding to the combustion in a current engine cycle of said first cylinder is defined by an angular interval equal to 360°, distributed from −180° before the upper dead center of compression to +180° after the upper dead center of compression.

* * * * *